United States Patent [19]

Perera

[11] Patent Number: 4,751,691

[45] Date of Patent: Jun. 14, 1988

[54] OPTICAL PROJECTION TIME-PIECE ATTACHMENT FOR SPECTACLES OR COMBINATION THEREOF

[76] Inventor: Kalukapuge T. Perera, 11194 SW. 114th Ter., Miami, Fla. 33176

[21] Appl. No.: 68,548

[22] Filed: Jul. 1, 1987

[51] Int. Cl.⁴ .................. G04B 47/00; G02C 1/00
[52] U.S. Cl. ................................. 368/10; 351/158
[58] Field of Search ............... 368/10, 276–279; 350/36, 174; 351/57, 158

[56] References Cited

U.S. PATENT DOCUMENTS

| | | | |
|---|---|---|---|
| 4,274,149 | 6/1981 | Flanagan | 368/10 |
| 4,526,473 | 7/1985 | Zahn, III | 368/10 |

Primary Examiner—Vit W. Miska

[57] ABSTRACT

A miniature time-piece attachment for use on spectacles or made as an integral component of a spectacles frame. The time-piece is of the electronic type displaying the time value as miniature light emitting numerical display when a miniature button is pressed. The time display is projected optically by a lens and clear transparent window arrangement such that the time display appears as a virtual image superimposed and projected at infinity on a side of the normal field of view of the spectacles wearer. When the display is not illuminated the normal field of view of the spectacles wearer is not impaired, or impaired as little as possible.

8 Claims, 3 Drawing Sheets

OPTICAL PROJECTION TIME-PIECE ATTACHMENT FOR SPECTACLES OR COMBINATION THEREOF

BACKGROUND OF THE INVENTION

Field of the Invention

This invention relates to a miniature electronic time-piece for attachment to spectacles or combination thereof capable of projecting and displaying time of day while the spectacles are worn.

SUMMARY OF THE INVENTION

The principal object of my invention is the combination of an electronic time-piece with spectacles or sunglasses to have the capability of projecting and displaying the time of day or night clearly and conveniently superimposed in the normal field of view of a spectacles or sunglass wearer.

Another special object of my invention is to provide the display of time of day or night clearly and conveniently for the elderly or those with vision impairment who uses spectacles.

Still another object of my invention is to provide the capability for the head up display of time of day or night so as not to distract the head away from a task such as the driving of an automobile.

DESCRIPTION OF THE PREFERRED EMBODIMENTS

The present invention will now be clarified in detail with reference to the drawings.

Figure 1:
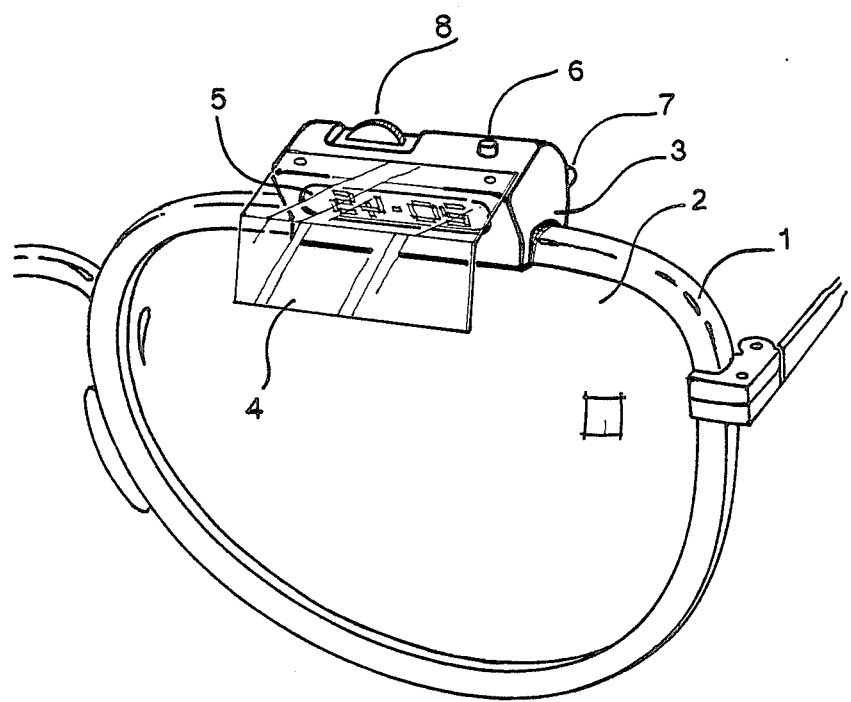
FIG. 1 shows the external perspective view of the miniature electronic time-piece attached to a spectacles frame.

FIG. 1 shows an embodiment of the present invention mounted on the top part of the rim of a spectacles frame labelled 1.

The miniature electronic time-piece is all self contained in the housing shown by reference label 3. The housing 3 contains a slot along it's bottom length so as to seat onto the rim of the spectacles frame 1 where it can be secured with a fixing screw.

The housing 3 shall contain all the electronics to provide the time function, the power source a miniature watch battery, the display panel a miniature electrical light emitting numerical display and an oblong lens 5 to optically project a virtual image of the display.

Modern electronic watch function generating technology today provides one single microminiature electronic chip which enables the time-piece housing 3 to be constructed very small.

FIG. 1 also shows a thumbwheel screw 8 which is used as an adjustment to focus the display image to suit the spectacles wearers eye.

A miniature push to make press button 6 on the top surface of the housing electrically connected to the electronic display enables the display to be illuminated whenever the user wishes to read the time.

Further miniature push buttons 7 connected to the watch function electronics are used to set the hour and minute of the time-piece.

The embodiment shown in FIG. 1 contains the light emitting time display panel inside the housing and facing away from the eye of the spectacle wearer. The projecting lens 5 is in the front of the housing and projects an image of the time display forward and away from the eye of the user. Therefore this embodiment uses an optically clear plastic window 4 mounted and facing at an angle to the front of the time-piece such that a partial image of the time display is reflected back through the spectacle lens 2 to reach the eye. A virtual image of the time display therefore appears superimposed in the normal field of view of the spectacles wearer when the display is illuminated. When the display is not illuminated the optically clear plastic window enables the normal view to be seen unhindered.

The above description of the embodiment will be further described by reference to FIG. 2.

Figure 2:
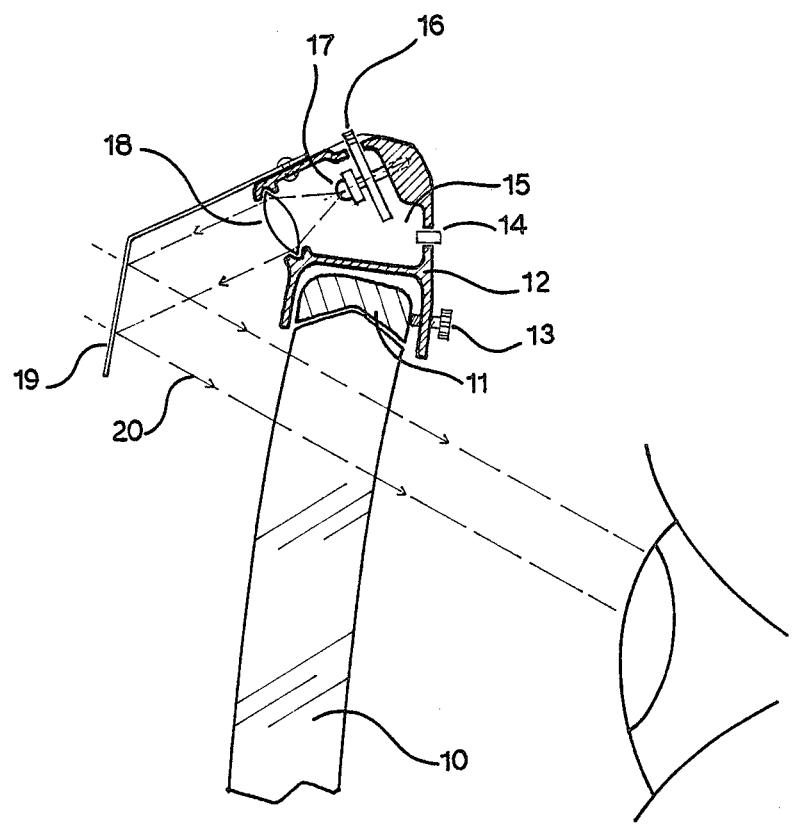
FIG. 2 is a cross-sectional view of one embodiment of the time-piece attached to a pair of spectacles.

FIG. 2 shows an enlarged cross-sectional view of the embodiment of the time-piece described above.

The time-piece housing 12 shows the mounting slot which fits onto the spectacles frame rim cross-section 11 and secured by the screw 13 to the rim of the spectacles frame.

The inside of the housing 12 is numbered 15 and shall contain the time function generating electronics and the miniature watch battery (not shown for clarity). The section of the flat light emitting display panel 17 is shown mounted at the end of a screw. This screw can be moved forward or backward by turning the thumbwheel 16 coupled to it, thereby causing the display panel to be moved forward or backward to achieve a focusing action against the fixed mounted projecting lens 18. The projecting lens 18 is a short focal length glass or plastic lens or even a flat fresnel lens.

FIG. 2 also shows one of the time setting push button switches 14 of the electronic time-piece.

The optically clear plastic window 19 is shown (in cross-section) mounted on the time-piece housing and protruding forward and at an angle almost in parallel to the glass surface 10 of the spectacle. As an illustration a typical path of the light rays emanating from the display surface is shown by the broken lines 20 focussed by the lens 18 and partially reflected by the clear plastic window 19 to reach the eye of the spectacles wearer.

The focussing of the display by the lens provide a virtual image of the display at infinity. The partial reflection by the clear window projects this virtual image in the normal field of view of the spectacles wearer.

Figure 3:
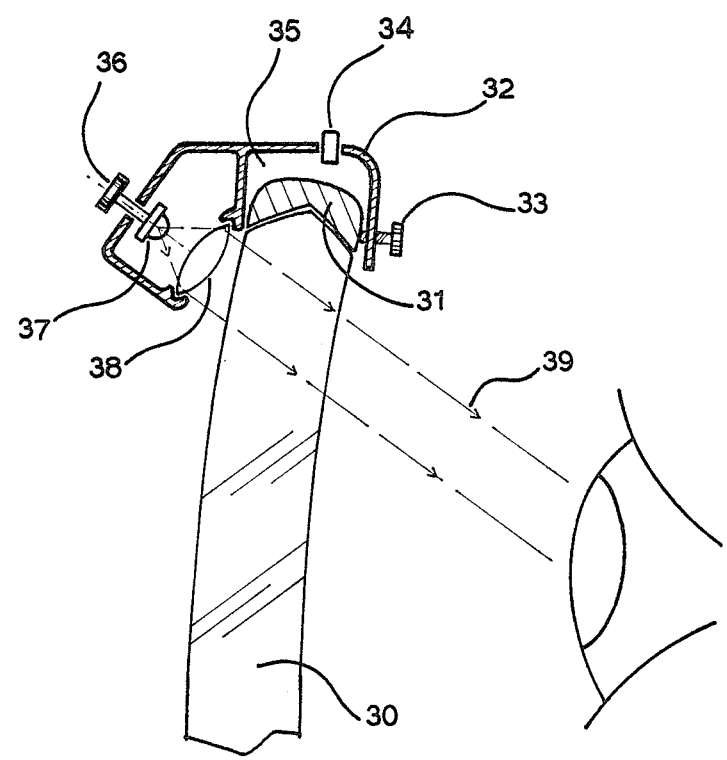
FIG. 3 is a cross-sectional view of a second embodiment of the time-piece attached to a pair of spectacles.

FIG. 3 shows the cross-sectional view of another embodiment of the invention.

Here is shown the time-piece housing 32 attached by the mounting slot on to the rim of the spectacles frame 31 and secured by the fixing screw 33. The inside of the housing 32 referenced by number 35 shall contain the electronics and the miniature watch battery (not shown for clarity). The section of the flat electrical light emitting display panel 37 is shown mounted at the end of the focussing screw 36. By turning the focussing screw 36 the display panel is moved back and forth to achieve focussing of the display against the fixed mounted lens 38.

The display panel and the lens faces the eye of the spectacles wearer directly and projects a virtual image of the display to the eye to appear at infinity in front of the eye. As an illustration the path of the light rays from the display are shown by the broken lines 39 passing through the spectacles glass 30 to reach the eye. Because this embodiment projects the display directly to the eye, it is placed in front of the top corner of the spectacles glass 30 and covers a small area of the top view of the spectacles wearer.

FIG. 3 also shows the display activating press button switch 34.

While the above description gives two embodiments of the invention for an electronic time-piece function for attachment to a spectacles these should not be construed as limitations on the scope of the invention. Many other variations are possible, for example the housing of the time-piece can be an integral part of the spectacles frame. Other additional functions apart from the time display are possible, such as by adding a more advanced light emitting text display panel, it could display extra information like day, month and preset text information.

Alarm displays to alert the user by automatically flashing a short text at preset times with audible pips.

In another advanced form the display can provide radio paging text information by coupling to the invention the output from an external radio paging device or even an extreamly miniature radio paging receiver may be integrated into the invention.

I claim:

1. Optical projection time-piece attachment for spectacles or sunglasses comprising:
   (a) a miniature housing with mounting and securing means for attachment to a pair of spectacles or sunglasses frame such that the normal field of vision is not obstructed,
   (b) micro electronic circuitry means to generate electrical time of day functions,
   (c) electric light emitting display panel means to display time of day using said electrical time of day functions,
   (d) lens means to project an image of said display, said display panel and said lens disposed in said housing such that said display image is generally projected outward approximately at an angle of 45 degrees in a direction relative to a diametrical line of one viewing surface of the spectacles or sunglasses,
   (e) a clear reflective window means to intercept and partially reflect said projected display image back towards the eye of the spectacles or sunglasses wearer so as to produce a virtual image of said time display superimposed on the normal field of view when said display is illuminated,
   (f) convenient means to adjust and focus said display image,
   (g) means for supplying electric power to said micro electronic circuitry and said electric light emitting display,
   (h) readily accessible press button switch means to activate said electric light emitting display when required,
   (i) further miniature switch means to set said electrical time of day functions.

2. Optical projection time-piece attachment for spectacles or sunglasses as claimed in claim 1 wherein said light emitting display further comprises either numeric or linear graphical type readout to represent time of day.

3. Optical projection time-piece attachment for spectacles or sunglasses as claimed in claim 1 wherein said clear reflective window is a thin optically transparent sheet which protrudes from said housing to stand in parallel with and in front of one viewing surface of the spectacles or sunglasses when the time-piece is attached.

4. Optical projection time-piece attachment for spectacles or sunglasses as claimed in claim 1 wherein said convenient focusing adjustment further comprises a miniature thumbwheel mechanically coupled to adjust the position of said display panel relative to said lens.

5. Head up time display spectacles or sunglasses comprising:
   (a) micro electronic circuitry means to generate electrical time of day functions built into a spectacles or suglasses frame,
   (b) electric light emitting display panel means to display time of day using said electrical time of day functions mounted within a compartment built into the rim of the spectacles or sunglasses frame,
   (c) said compartment holding said electric light emitting display panel additionally containing a miniature lens means to project an image of said display, Said display panel and said lens disposed such that said display image is projected generally outward approximately at an angle of 45 degrees in a direction relative to a diametrical line of one viewing surface of the spectacles or sunglasses,
   (d) a clear reflective window means to intercept and partially reflect said projected display image back towards the eye of the spectacles or sunglasses wearer so as to produce a virtual image of said time display superimposed in the normal field of view when said display is illuminated,
   (e) convenient means to adjust and focus said display image,
   (f) means for supplying electric power to said micro electronic circuitry and said electric light emitting display,
   (g) readily accessible press button switch means to activate said electric light emitting display when required,
   (h) further miniature switch means to set said electrical time of day functions.

6. Head up time display spectacles or sunglasses as claimed in claim 5 wherein said light emitting display further comprises either numeric or linear graphical type readout to represent time of day.

7. Head up time display spectacles or sunglasses as claimed in claim 5 wherein said clear reflective window is a thin optically transparent sheet mounted on to the spectacles or sunglasses frame to protrude and stand parallel with and in front of one viewing surface of the spectacles or sunglasses.

8. Head up time display spectacles or sunglasses as claimed in claim 5 wherein said convenient focussing adjustment further comprises a miniature thumbwheel mechanically coupled to adjust the position of said display panel relative to said lens.

* * * * *